(12) United States Patent
Ogawa et al.

(10) Patent No.: US 10,272,963 B2
(45) Date of Patent: Apr. 30, 2019

(54) CONVEYANCE SEAT

(71) Applicant: TS TECH CO., LTD., Asaka-shi, Saitama (JP)

(72) Inventors: Tatsuro Ogawa, Tochigi (JP); Yuichi Honma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/748,445

(22) PCT Filed: Jul. 29, 2016

(86) PCT No.: PCT/JP2016/072367
§ 371 (c)(1),
(2) Date: Jan. 29, 2018

(87) PCT Pub. No.: WO2017/022676
PCT Pub. Date: Feb. 9, 2017

(65) Prior Publication Data
US 2018/0251176 A1    Sep. 6, 2018

(30) Foreign Application Priority Data
Jul. 31, 2015 (JP) .................. 2015-152364

(51) Int. Cl.
*B62J 1/12* (2006.01)
*B62J 1/18* (2006.01)
(Continued)

(52) U.S. Cl.
CPC . *B62J 1/12* (2013.01); *B62J 1/18* (2013.01); *B62J 1/20* (2013.01); *B62J 1/22* (2013.01)

(58) Field of Classification Search
CPC ......... B62J 1/12; B62J 1/18; B62J 1/20; B62J 1/22
(Continued)

(56) References Cited

U.S. PATENT DOCUMENTS 6,318,743 B1 * 11/2001 Nakashima ............... B62J 15/00
180/219
8,534,407 B2 * 9/2013 Koda ......................... B62J 1/08
180/219
(Continued)

FOREIGN PATENT DOCUMENTS

JP      S60-173480 U    11/1985
JP      2001-341680     12/2001
(Continued)

*Primary Examiner* — Mark R Wendell
(74) *Attorney, Agent, or Firm* — Drinker Biddle & Reath LLP (57) ABSTRACT

The present disclosure provides a conveyance seat that can discharge liquid splashed on a cover member of the seat so that clothing does not get wet with the liquid remaining on the cover member. A conveyance seat includes a bottom plate and a cover member attached to the bottom plate. A discharge hole for discharging the liquid splashed on the cover member is formed in the bottom plate. The cover member includes: a slit by which the surface is divided; and welded portions where portions of the cover member divided by the slit are welded together. The welded portions are inclined toward the discharge hole to form discharge lines which guide discharge of the liquid splashed on the cover member.

8 Claims, 10 Drawing Sheets

(51) Int. Cl.
*B62J 1/20* (2006.01)
*B62J 1/22* (2006.01)

(58) Field of Classification Search
USPC .................................................. 297/219.11
See application file for complete search history.

(56) References Cited

U.S. PATENT DOCUMENTS

| 8,864,157 B2* | 10/2014 | Tsutsui ...................... B62J 6/18 |
| | | 280/152.1 |
| 2013/0020781 A1* | 1/2013 | Kishikawa ............. B62K 19/06 |
| | | 280/281.1 |
| 2016/0177607 A1* | 6/2016 | Hara ......................... B62J 1/12 |
| | | 297/188.1 |

FOREIGN PATENT DOCUMENTS

| JP | 2010-012807 A | | 1/2010 |
| JP | 5337560 B2 | | 11/2013 |
| JP | 2013226946 | * | 11/2013 |

* cited by examiner

CONVEYANCE SEAT

CROSS-REFERENCE TO RELATED APPLICATIONS

This application is a National Stage Entry application of PCT Application No. PCT/JP2016/072367, filed Jul. 29, 2016, which claims the priority benefit of Japanese Patent Application No. JP 2015-152364, filed on Jul. 31, 2015, the contents being incorporated herein by reference.

BACKGROUND

The present disclosure relates to a conveyance seat and particularly pertains to a conveyance seat including a discharge hole for discharging liquid adhered to a cover member.

In conveyance seats exposed to the outdoors, such as seats mounted on a two-wheeled automotive vehicle, liquid such as raindrops may remain on the seat. In addition, when an occupant sits on the seat, the occupant's clothing may get dirty by the liquid remaining on the seat or the occupant may feel uncomfortable with the liquid adhered to the clothing.

Japanese Patent Publication JP 5337560 B discloses, as a technique to prevent liquid from remaining between a backrest and a seat body of a seat for two-wheeled or three-wheeled vehicles among such conveyance seats, the technique in which ribs are formed between a backrest and a seat body to form a gap therebetween and thereby liquid is prevented from remaining therebetween.

More specifically, the liquid remains between the backrest and the seat body and the backrest is pressed when an occupant sits on the seat. Accordingly, the backrest separates from the seat body and the liquid leaks out from between the backrest and the seat body; therefore, clothing may get dirty by the liquid. According to the technique disclosed in Japanese Patent Publication JP 5337560 B, the gap is formed in advance by the ribs between the backrest and the seat body; thereby, such problem is solved, that is, the liquid is prevented from remaining between the backrest and the seat body.

As in Japanese Patent Publication JP 5337560 B, the gap is formed between the backrest and the seat body and thereby the liquid can be prevented from remaining therebetween; however, it is problematic that the liquid is prevented from remaining in a portion other than the gap between the backrest and the seat body. For example, in a seat where a groove is provided in a cushion material and a cover member is pulled into the groove, liquid may remain in the groove. Therefore, a conveyance seat has been required to include the structure where the water that has entered a gap in a cover member is discharged without remaining in the gap. Further, in discharging the water from the cover member, it is necessary that the water is prevented from entering an unexpected portion, for example, a portion where a cushion material susceptible to hydrolysis or an electric system such as a connector is located.

SUMMARY

Various embodiments of the present disclosure provide a conveyance seat which can smoothly discharge liquid splashed on a cover member so that clothing may not get wet with the liquid remaining on the cover member. Also, an embodiment of the present disclosure prevents the liquid from leaking out to an unexpected portion.

The foregoing problem can be solved by an embodiment of a conveyance seat according to the present disclosure, including: a bottom plate; and a cover member adapted to be attached to the bottom plate, wherein a discharge hole configured to discharge liquid splashed on the cover member is formed in the bottom plate; the cover member includes a divided portion by which the cover member is divided into a first portion and a second portion; a welded portion where a portion of the first portion and a portion of the second portion are welded together is formed on the cover member; and in a state where the cover member is attached to the bottom plate, the welded portion is inclined downward toward the discharge hole to form at least one discharge line configured to guide discharge of the liquid splashed on the cover member.

According to the above configuration, even when the liquid enters the divided portion of the cover member, the liquid is discharged along the inclination of the discharge line formed by the welded portion where portions of the divided portion are welded together, thereby being discharged through the discharge hole. Therefore, the liquid does not remain in the divided portion, and clothing of a seated occupant can be prevented from getting wet.

Also, a top-side protrusion surrounding the discharge hole may be formed on the top side of the bottom plate. According to the above configuration, the liquid flowing from the cover member can be held in the periphery of the discharge hole by the top-side protrusion and thereby the liquid can be prevented from unexpectedly leaking out to a cushion material or the like located around the discharge hole.

Further, a back-side protrusion surrounding the discharge hole may be formed on the back side of the bottom plate. According to the above configuration, the liquid discharged through the discharge hole can be prevented by the back-side protrusion from entering an electric wire, a connector, or the like on the back side of the bottom plate.

Furthermore, the cover member may include a discharge guide portion that extends through the discharge hole of the bottom plate to guide discharge of the liquid, and the discharge guide portion may be formed protruded compared to its surroundings. According to the above configuration, the cover member includes the discharge guide portion and thereby the liquid flowing from the cover member is guided along the discharge guide portion to the discharge hole. Therefore, the liquid can be prevented from leaking out to the surroundings of the discharge hole.

Moreover, in a state where the cover member is attached to the bottom plate, the first portion and the second portion may extend through and beyond the discharge hole to be fixed to the bottom plate at different positions thereof so that a release portion is formed at an end of the discharge line. According to the above configuration, the first portion and the second portion extend through and beyond the discharge hole to be fixed to the bottom plate at the different positions thereof so that the release portion is formed; therefore, the liquid can be smoothly discharged from the release portion.

Also, a passage hole that provides a space surrounded by the first portion, the second portion, and the welded portion to be communicated with the outside may be formed in the cover member, and the cover member may be attached to the bottom plate such that the at least one discharge line comprises a plurality of discharge lines that extend downward of the discharge hole and such that the passage hole is arranged below the discharge hole. According to the above configuration, the passage hole is formed in the cover member. Thus, instead of the configuration where the liquid is discharged from a portion to which the discharge line extends, the liquid can be discharged from the passage hole. Consequently, for example, even if the portion to which the discharge line extends is closed by a staple or the like, the liquid can be smoothly discharged from the passage hole.

Further, in a state where the cover member is attached to the bottom plate, the first portion and the second portion may extend through and beyond the discharge hole to be fixed to the bottom plate in an overlapped manner, and the passage hole may be formed in one of the first portion and the second portion, which is arranged below the other of the first portion and the second portion. According to the above configuration, the first portion and the second portion are overlapped with each other and thereby are fixed together by a staple or the like to the bottom plate. In addition, the passage hole is formed in one of the first portion and the second portion, which is arranged below the other of the first portion and the second portion. Therefore, the liquid can be smoothly discharged from the passage hole.

Furthermore, the bottom plate may include a bottom portion and a backrest portion arranged rearward of the bottom portion, the bottom portion and the backrest portion may be covered by the cover member. The discharge hole may be formed between the bottom portion and the backrest portion. The divided portion may be arranged between the bottom portion and the backrest portion in a state where the cover member is attached to the bottom plate. According to the above configuration, the discharge hole is formed between the bottom portion and the backrest portion and the divided portion is arranged therebetween. Therefore, even in a state where the bottom plate is covered by the cover member, the liquid can be discharged from the divided portion through the discharge hole located between the bottom portion and the backrest portion.

According to the present disclosure, the liquid does not remain in the divided portion of the cover member and thus clothing of a seated occupant can be prevented from getting wet. Further, the liquid can be prevented from leaking to the surroundings of the discharge hole, and the liquid can be prevented from leaking out to an unexpected portion such as the cushion material or the connector. Furthermore, the liquid flowing through the discharge hole can be smoothly discharged from the release portion or the passage hole. Moreover, the first portion and the second portion of the cover member can be fixed together to the bottom plate, and in addition, the liquid flowing through the discharge hole can be smoothly discharged from the passage hole. Also, the liquid can be discharged from the discharge hole located between the bottom portion and the backrest portion.

DETAILED DESCRIPTION

Embodiments of the present disclosure are described herein with reference to the drawings. A conveyance seat of the present disclosure is applied to a conveyance including a seat exposed outside, and specifically, the conveyance seat may be applied to a two-wheeled automotive vehicle, an automobile three-wheeled vehicle, an industrial vehicle, or the like. In the following embodiments, a conveyance seat 1 for a two-wheeled automotive vehicle is described.

In addition, the embodiments described below are each merely an example for facilitating understanding of the present disclosure and may not limit the present disclosure. In other words, it will be understood that the shape, dimensions, arrangement, or the like of each component to be described below can be changed and modified without departing from the scope of the present disclosure and that the present disclosure may include equivalents thereof.

In the following description, "a front to back direction" corresponds to a front to back direction of the conveyance seat 1 and coincides with a travelling direction of the two-wheeled automotive vehicle. "A width direction" corresponds to a width (right-to-left width) of the conveyance seat 1.

First Embodiment

[Configuration of Conveyance Seat]

Figure 1:
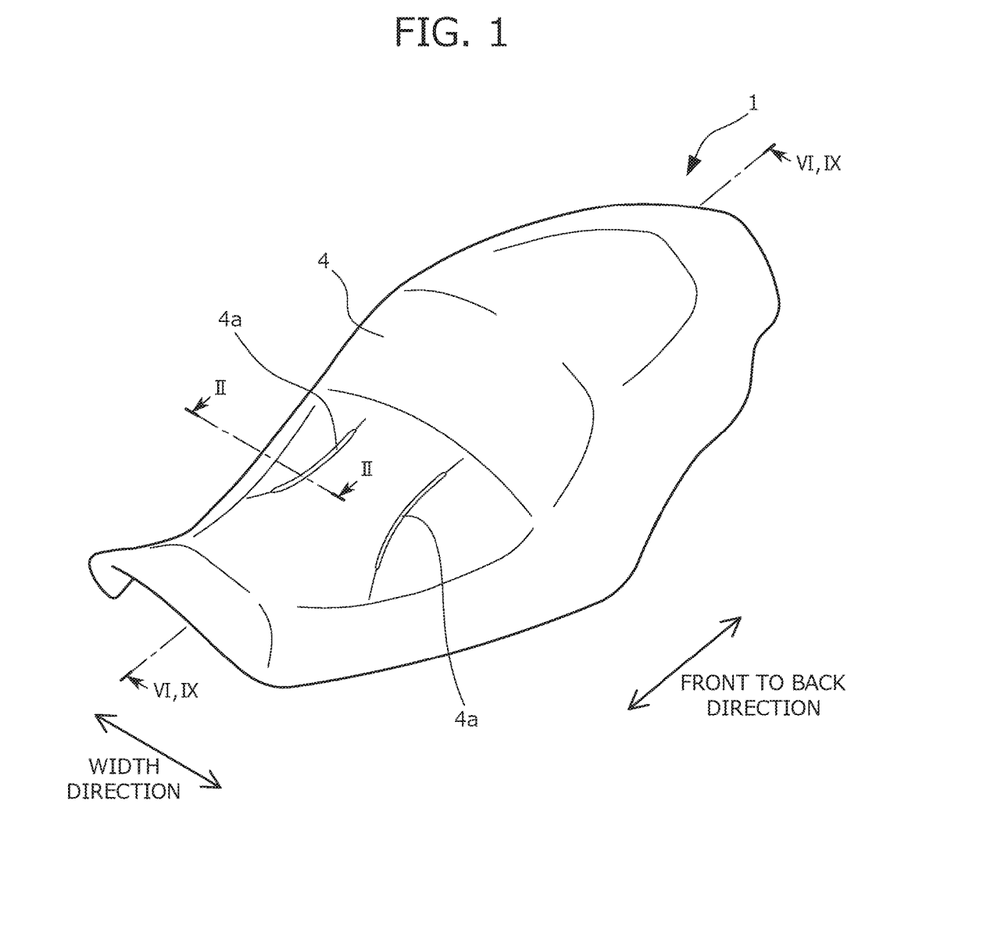
FIG. 1 is a perspective view of a conveyance seat according to a first embodiment of the present disclosure.
Figure 2:
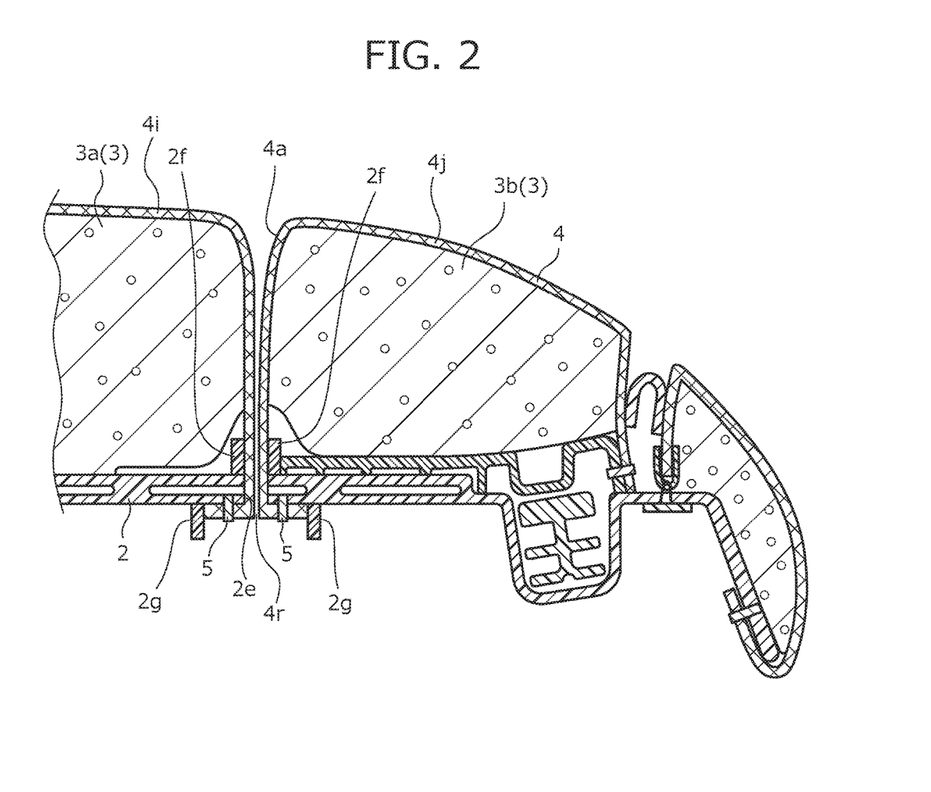
FIG. 2 is a cross-sectional view taken along the line II-II of FIG. 1 and schematically showing a fixed portion of an end of a cover member to a bottom plate.
Figure 3:
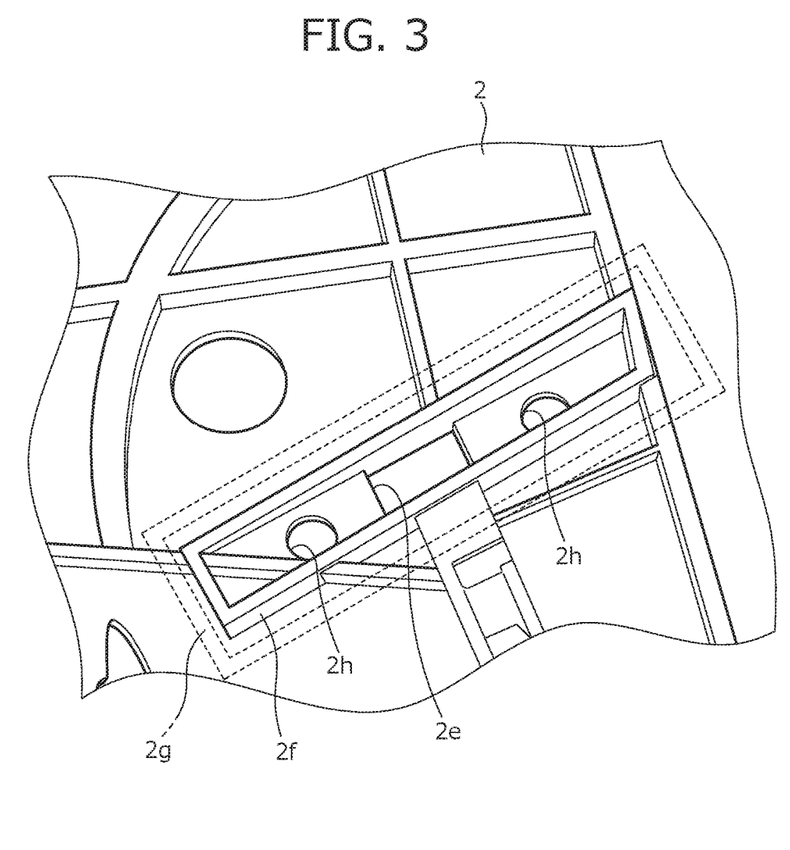
FIG. 3 is a perspective view showing a vertical wall provided on the top surface of the bottom plate and a vertical wall provided on the back surface of the bottom plate.
Figure 4:
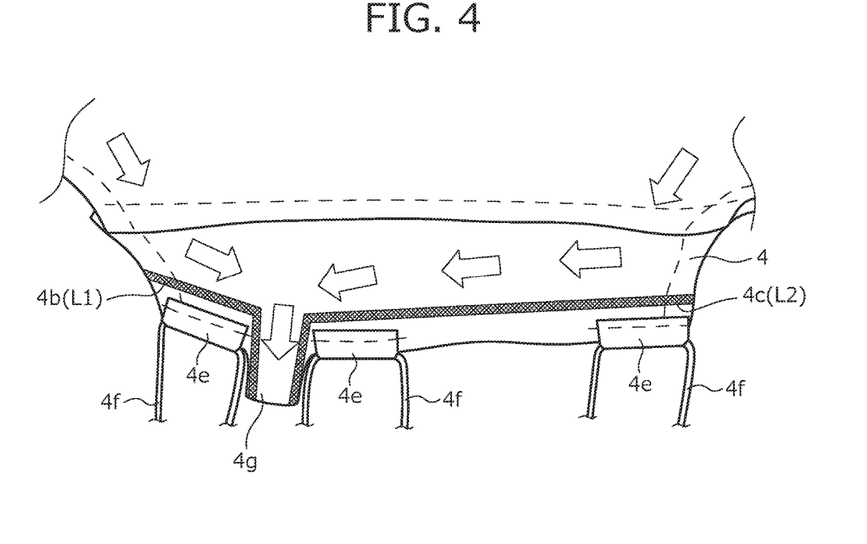
FIG. 4 is a schematic side view showing the end of the back surface of the cover member and schematically illustrating discharge lines, formed by welded portions, and the liquid flow.
Figure 5:
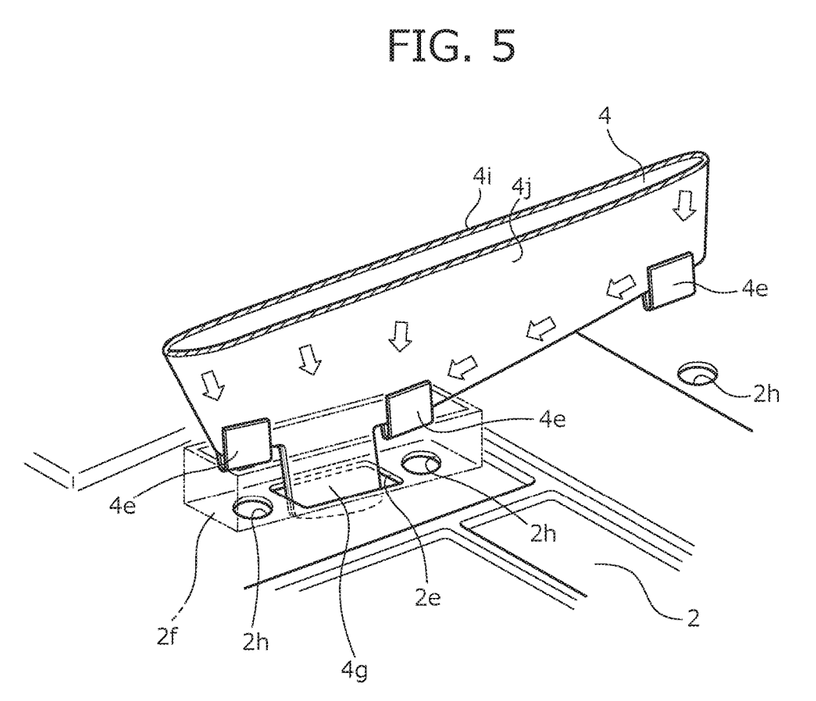
FIG. 5 is a perspective view showing a state of the surroundings of a discharging guide portion provided at the cover member.

First, the configuration of the conveyance seat 1 according to a first embodiment of the present disclosure is described with reference to FIG. 1 to FIG. 5. In addition, FIG. 1 is a perspective view of the conveyance seat 1, and FIG. 2 is a cross-sectional view taken along the line II-II of FIG. 1 and schematically showing a fixed portion of an end of a cover member 4 to a bottom plate 2. FIG. 3 is a perspective view showing a vertical wall 2*f* provided on the top surface of the bottom plate 2 and a vertical wall 2*g* provided on the back surface of the bottom plate 2. Further, FIG. 4 is a drawing showing the end of the back surface of the cover member 4 and schematically illustrating discharge lines L1, L2 respectively formed by welded portions 4*b*, 4*c* and the liquid flow. FIG. 5 is a perspective view showing a state of the surroundings of a discharge guide portion 4*g* provided at the cover member 4. Furthermore, the liquid flow is indicated by arrows in FIG. 4 and FIG. 5.

The conveyance seat 1 is an example of a conveyance seat and is a straddle-type seat of a two-wheeled automotive vehicle on which an occupant sits. The conveyance seat 1 is installed on a seat attachment portion (not shown) provided on a frame of the two-wheeled automotive vehicle. As shown in FIG. 1 and FIG. 2, the conveyance seat 1 mainly includes the bottom plate 2, a cushion material 3 mounted on the bottom plate 2, and the cover member 4 attached to the bottom plate 2 while covering the cushion material 3.

The bottom plate 2 is made of a synthetic resin or the like. In particular, pull-in holes 2h which are shown in FIG. 3 and through which loops 4f (described below) extend, for pulling in the cover member 4, are formed in the bottom plate 2. Also, a discharge hole 2e through which the end of the cover member 4 extends to discharge liquid, such as rainwater splashed on the cover member 4, is formed in the bottom plate 2 so as to be located adjacent to the pull-in holes 2h. In addition, as shown in FIG. 2 and FIG. 3, the vertical wall 2f as a top-side protrusion formed to protrude on the top side of the bottom plate 2 and the vertical wall 2g as a back-side protrusion formed to protrude on the back side of the bottom plate 2 are formed on the bottom plate 2 so as to surround the discharge hole 2e and the pull-in holes 2h.

The cushion material 3 is made of a foamed material such as a slab urethane foam and is configured to be divided into a plurality of portions, i.e. a center portion 3a, side portions 3b, and other portions in the seat width direction, as shown in FIG. 2.

A plurality of covers made of vinyl leather or the like are sewn together, thereby forming the cover member 4. The end of the cover member 4 is fixed by staples 5 to the bottom plate 2. Also, the cover member 4 includes: a center cover 4i as a first portion according to the present disclosure, which is located in the center in the seat width direction; and side covers 4j, each as a second portion according to the present disclosure, which is located at the side in the seat width direction. A side portion of the center cover 4i and a center portion of the side cover 4j are overlapped with each other to be interposed between the center portion 3a and each of the side portions 3b of the cushion material 3, thereby forming a slit 4a, which corresponds to a divided portion according to the present disclosure. Respective ends of the center cover 4i and the side cover 4j interposed between the center portion 3a and the side portion 3b are pulled into the pull-in holes 2h by the loops 4f shown in FIG. 4; thereby, the cover member 4 is closely attached to the cushion material 3 and brought into a stretched state. In addition, the loops 4f are held by tarpaulin fabrics 4e as reinforcement fabrics sewn to the cover member 4.

The discharge guide portion 4g configured to guide discharge of the liquid is formed at the lower end of a portion of the cover member 4 at which the center cover 4i and the side cover 4j are overlapped with each other. The discharge guide portion 4g is formed in a tongue shape protruding downward relative to other portions to extend through the discharge hole 2e of the bottom plate 2. In addition, as shown in FIG. 2, a distal end of the discharge guide portion 4g at the center cover 4i is fixed by the staple 5 to the bottom plate 2 located in the center in the seat width direction. A distal end of the discharge guide portion 4g at the side cover 4j is fixed by the staple 5 to the bottom plate 2 located at the side in the seat width direction. As just described, the distal end of the discharge guide portion 4g at the center cover 4i and the distal end of the discharge guide portion 4g at the side cover 4j are fixed to the bottom plate 2 at different positions thereof; thereby, a release portion 4r for discharging the liquid passing the discharge guide portion 4g is formed in the cover member 4.

Also, as shown in FIG. 4, the center cover 4i and the side cover 4j are welded together in an overlapped manner in the slit 4a. Welded portions 4b, 4c where welding is applied as just described form respective portions of discharge lines L1, L2. The discharge lines L1, L2 are positioned above the loops 4f and the tarpaulin fabrics 4e at the end of the back surface of the cover member 4, and the back surface of the cover member 4 is a surface of the cover member 4, which is provided in contact with the cushion material 3.

The welded portions 4b, 4c are formed by high-frequency welding processing, and the surfaces of the cover member 4 are overlapped to be closely attached by the welded portions 4b, 4c without a gap. Also, the discharge lines L1, L2 on the cover member 4 may not have to be formed by high-frequency welding processing as long as portions of the surface of the cover member 4 are closely attached without a gap. Alternatively, the discharge lines L1, L2 may be formed by bonding with adhesive or the like.

The discharge lines L1, L2 formed by the welded portions 4b, 4c as described above are configured to guide the liquid dripping from the surface of the cover member 4 to the discharge guide portion 4g. Specifically, one portion of each of the discharge line L1 and the discharge line L2 extends slightly obliquely downward toward the discharge guide portion 4g from an outer end of the cover member 4 in the width direction while extending to a position to which an outer end of the discharge guide portion 4g in the width direction extends. In other words, one portion of each of the discharge line L1 and the discharge line L2 extends above and adjacent to the discharge guide portion 4g, and an end of the one portion of the discharge line L1 and an end of the one portion of the discharge line L2 are opposite to and separated from each other. The other portion of each of the discharge line L1 and the discharge line L2 extends continuously from each of the end of the one portion of the discharge line L1 and the end of the one portion of the discharge line L2, which are opposite to each other, to extend toward the lower end of the discharge guide portion 4g along the outer end of the discharge guide portion 4g in the width direction.

[Function of the Conveyance Seat]

In the conveyance seat 1 configured as described above, the discharge lines L1, L2 are formed and thereby the liquid entering from the slit 4a flows in the directions indicated by the arrows in FIG. 4. and FIG. 5 to be discharged downward of the bottom plate 2 along the discharge guide portion 4g extending through the discharge hole 2e. Also, even if the bottom plate 2 is covered by the cover member 4, the slit 4a is formed in the cover member 4; therefore, the liquid can be discharged from the slit 4a through the discharge hole 2e. Consequently, the liquid can be prevented from remaining in the slit 4a and clothing of an occupant can be prevented from getting wet by the remaining liquid.

Further, the vertical walls 2f, 2g are formed as described above and thereby the liquid passing the discharge guide portion 4g to be described below can be prevented from leaking to the outside of the vertical wall 2f on the top surface of the bottom plate 2 and to the outside of the vertical wall 2g on the back surface of the bottom plate 2. Therefore, electrical leakage of electric systems or hydrolysis in the cushion material 3 can be inhibited.

Furthermore, the discharge hole 2e as a discharging portion for the liquid is formed in the bottom plate 2 covered by the cushion material 3 and the cover member 4, therefore not being visibly exposed outside. Thus, providing the discharge hole 2e does not restrict the function thereof in the design perspective and does not impair merchantability on the outer appearance.

In the foregoing description, the above discharge lines L1, L2 are configured such that the other portion of each of the discharge line L1 and the discharge line L2 is formed continuously with the one portion of each of the discharge line L1 and the discharge line L2 to extend toward the lower end of the discharge guide portion 4g along the outer end of the discharge guide portion 4g in the width direction; however, the present disclosure is not limited to such configuration. For example, if the liquid flowing along the discharge lines L1, L2 does not pass beyond the vertical walls 2f, 2g, portions of the discharge lines L1, L2, which are formed along the ends of the discharge guide portion 4g are not necessarily required. Such a case is based on the assumption, for example, that the ends of the discharge lines L1, L2, which are opposite to each other, are located adequately close to each other.

Second Embodiment

Figure 6:
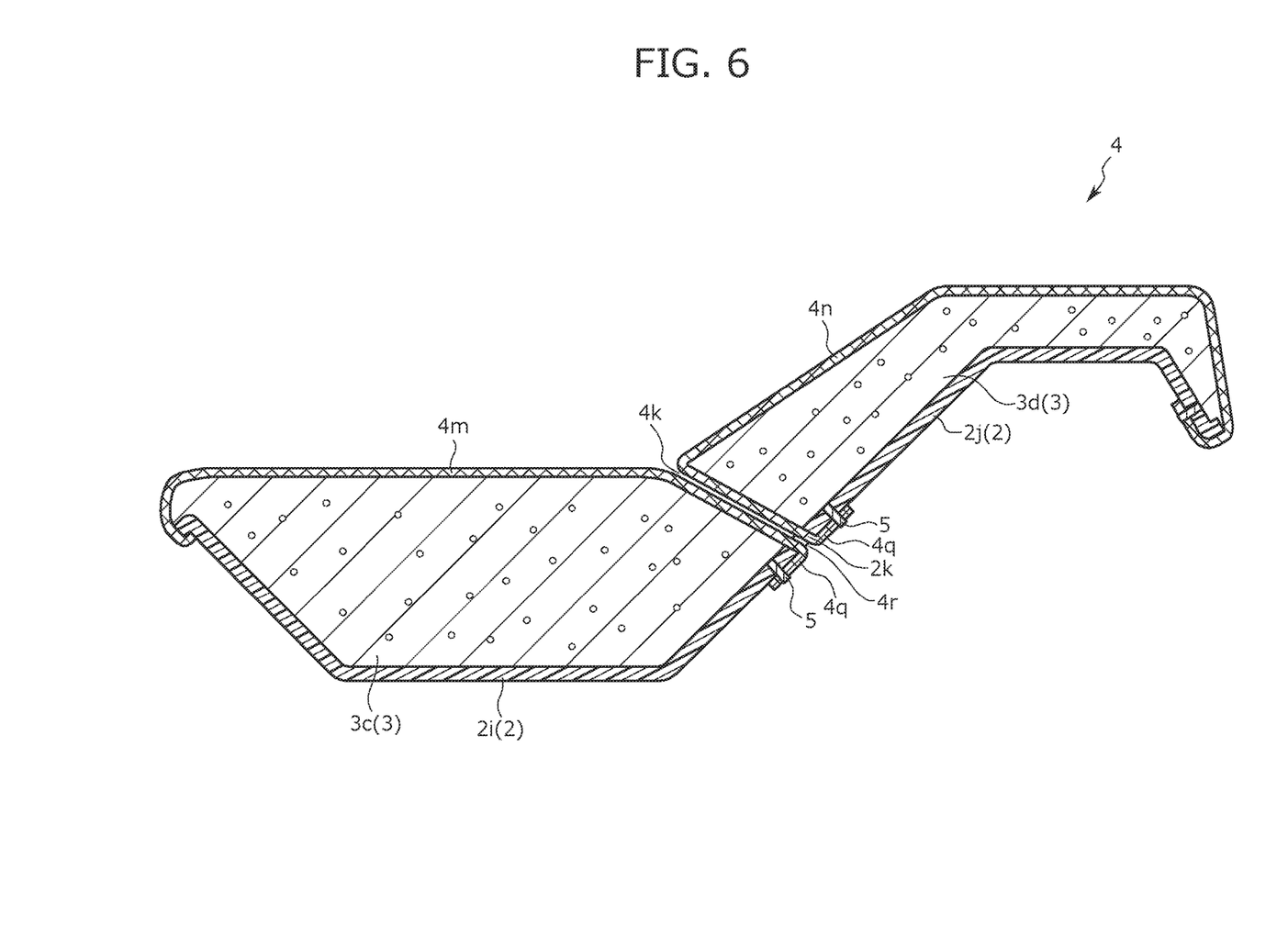
FIG. 6 is a cross-sectional view corresponding to a cross-section taken along the line VI-VI of FIG. 1 and schematically showing a state where the cover member according to a second embodiment of the present disclosure is fixed to the bottom plate.
Figure 7:
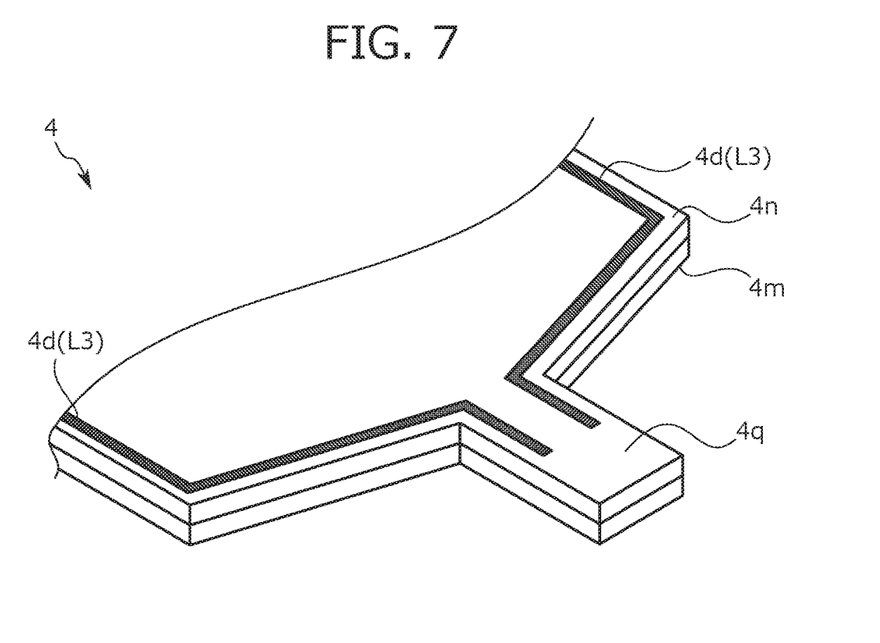
FIG. 7 is a schematic perspective view showing a state where respective portions of a front cover and a rear cover that are overlapped with each other are welded together by welded portions.
Figure 8A:
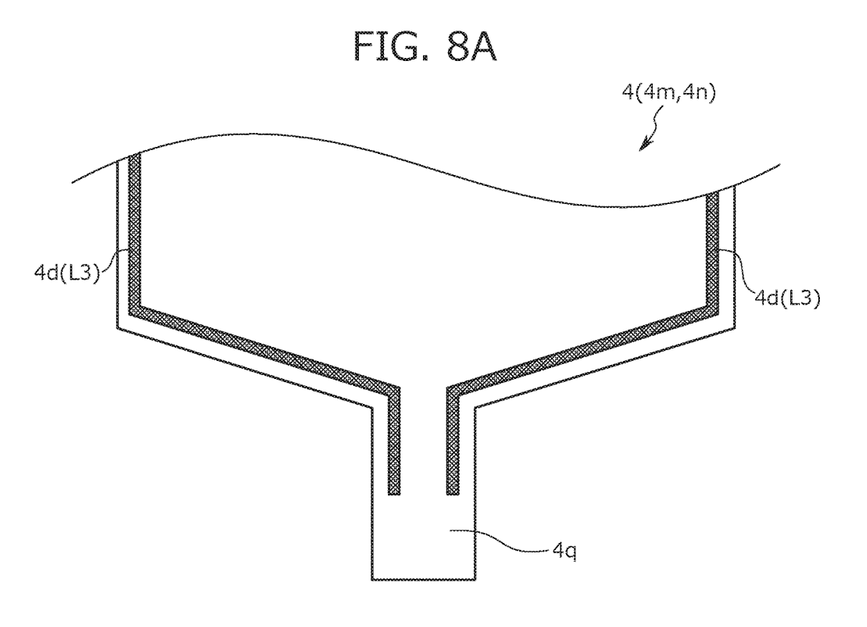
FIG. 8A is a schematic view showing an example of the welded portions.
Figure 8B:
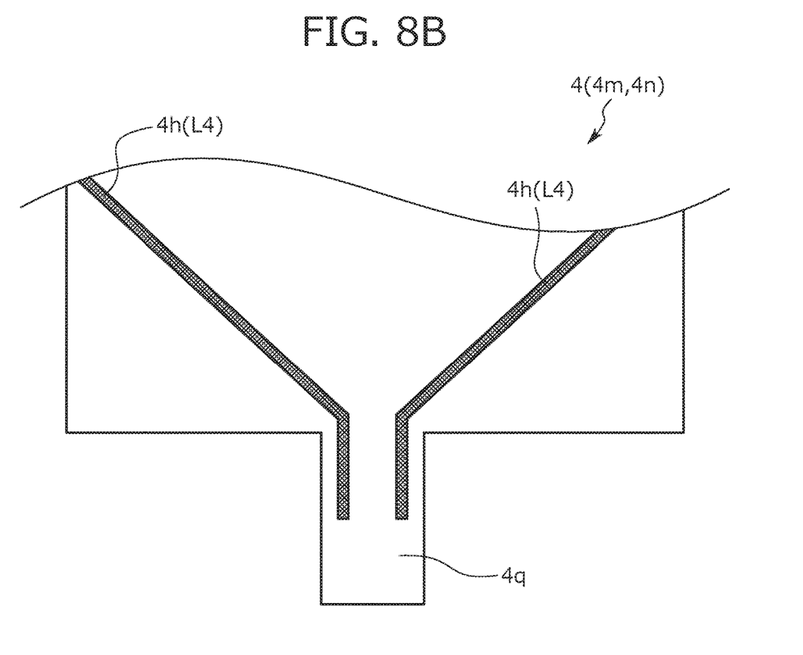
FIG. 8B is a schematic view showing an example of other welded portions.

Next, the configuration of a front cover 4m as the first portion according to the present disclosure and the configuration of a rear cover 4n as the second portion according to the present disclosure are described with reference to FIG. 6, FIG. 7, FIG. 8A, and FIG. 8B, wherein the front cover 4m and the rear cover 4n configure the cover member 4 according to a second embodiment of the present disclosure. In addition, in the second embodiment, differences from the first embodiment is mainly described and the same configurations as those of the first embodiment will not be described in order to clarify the differences from the first embodiment. Also, FIG. 6 is a cross-sectional view corresponding to a cross-section taken along the line VI-VI of FIG. 1 and schematically showing a state where the cover member 4 according to the second embodiment is fixed to the bottom plate 2. Further, FIG. 7 is a schematic perspective view showing a state where respective portions of the front cover 4m and the rear cover 4n that are overlapped with each other are welded together by welded portions 4d. Furthermore, FIG. 8A is a schematic view showing an example of the welded portions 4d and FIG. 8B is a schematic view showing an example of other welded portions 4h.

The bottom plate 2 according to the present embodiment includes a bottom portion 2i and a backrest portion 2j provided rearward of the bottom portion 2i. A discharge hole 2k through which the end of the cover member 4 extends to discharge liquid such as rainwater is formed between the bottom portion 2i and the backrest portion 2j of the bottom plate 2.

As shown in FIG. 6, the cushion material 3 is divided into a front portion 3c and a rear portion 3d in the front to back direction of the seat. The cover member 4 includes: the front cover 4m located above the bottom portion 2i to cover the surface of the front portion 3c of the cushion material 3; and the rear cover 4n located above the backrest portion 2j to cover the surface of the rear portion 3d. The cover member 4 is interposed between the front portion 3c and the rear portion 3d of the cushion material 3 to form a slit 4k as the divided portion according to the present disclosure. With the slit 4k, even if the bottom portion 2i and the backrest portion 2j are covered by the cover member 4, the liquid can be discharged from the slit 4k through the discharge hole 2k.

As shown in FIG. 7, a discharge guide portion 4q configured to guide discharge of the liquid is formed at the lower end of a portion at which the front cover 4m and the rear cover 4n interposed between the front portion 3c and the rear portion 3d are overlapped with each other; in other words, the discharge guide portion 4q is formed at the lower end of the slit 4k.

In addition, a distal end of the discharge guide portion 4q at the front cover 4m is fixed by the staple 5 to the bottom portion 2i of the bottom plate 2, as shown in FIG. 6. A distal end of the discharge guide portion 4q at the rear cover 4n is fixed by the staple 5 to the backrest portion 2j of the bottom plate 2. As just described, the distal end of the discharge guide portion 4q at the front cover 4m and the distal end of the discharge guide portion 4q at the rear cover 4n extend through and beyond the discharge hole 2k to be fixed to the bottom plate 2 at different positions thereof; thereby, the release portion 4r for discharging the liquid passing the discharge guide portion 4q is formed in the cover member 4.

[Welded Portion]

Also, as shown in FIG. 7 and FIG. 8, the front cover 4m and the rear cover 4n are welded in an overlapped manner in the slit 4k. The welded portions 4d where welding is applied as just described forms a pair of discharge lines L3 symmetric to each other with respect to the center in the seat width direction.

The pair of discharge lines L3 extends along the end of the front cover 4m and the rear cover 4n. Specifically, the pair of discharge lines L3 extends substantially in parallel with each other at outer portions thereof located on the upper side of the discharge lines L3 and in the seat width direction, is bent at predetermined positions thereof located on the lower side toward the center in the seat width direction to extend obliquely downward, and extends again in parallel with each other from a portion above the discharge guide portion 4q toward the end of the discharge guide portion 4q. In addition, the pair of discharge lines L3 is formed so as to extend downward of the discharge hole 2k of the bottom plate 2 in a state where the end of the discharge guide portion 4q of the cover member 4 is attached to the bottom plate 2.

Further, in order that the front cover 4m and the rear cover 4n are separated from each other and foldable so as to form the release portion 4r at the end portion of the discharge guide portion 4q, the pair of discharge lines L3 is formed so as not to extend to the end of the discharge guide portion 4q and thus a predetermined distance from the end of the discharge guide portion 4g is provided.

Furthermore, the shapes of the welded portions and the discharge lines according to the present disclosure are not limited to the shape of the discharge lines L3 formed by the welded portion 4d and the welded portion 4d. Alternatively, the welded portions and the discharge lines may have the shapes of the welded portions 4h and the discharge lines L4, as shown in FIG. 8B. The discharge lines L4 are formed so as not to extend along the end of the front cover 4m and the rear cover 4n. Specifically, the discharge lines L4 are different from the discharge lines L3 in that the discharge lines L4 do not extend in parallel with each other at outer portions thereof located on the upper side of the discharge lines L4 and in the seat width direction, and the discharge lines L4 are formed to have a tapered shape toward the discharge guide portion 4q while extending at a sharp angle compared with the obliquely downward extending portions of the discharge lines L3.

As described above, the inclination of each discharge line L4 is formed to have a sharp angle smaller than that of the inclination of each discharge line L3 and thereby liquid splashed on the cover member 4 can be smoothly discharged along the discharge lines L4. On the other hand, the discharge lines L3 are formed along the end of the front cover 4m and the rear cover 4n. Accordingly, a space formed by the welded portions 4d in the slit 4k between the front cover 4m and the rear cover 4n can be larger than a space formed by the discharge lines L4. Therefore, even when a large volume of liquid enters the slit 4k, the liquid can be prevented from overflowing from the slit 4k to the surface of the cover member 4 on which an occupant is seated.

The configuration of the discharge lines L3 or the discharge lines L4 formed between the front cover 4m and the rear cover 4n can be surely applied to the configuration of the discharge line L1 and the discharge line L2 that are formed between the center cover 4i and the side cover 4j according to the first embodiment.

Third Embodiment

Figure 9:
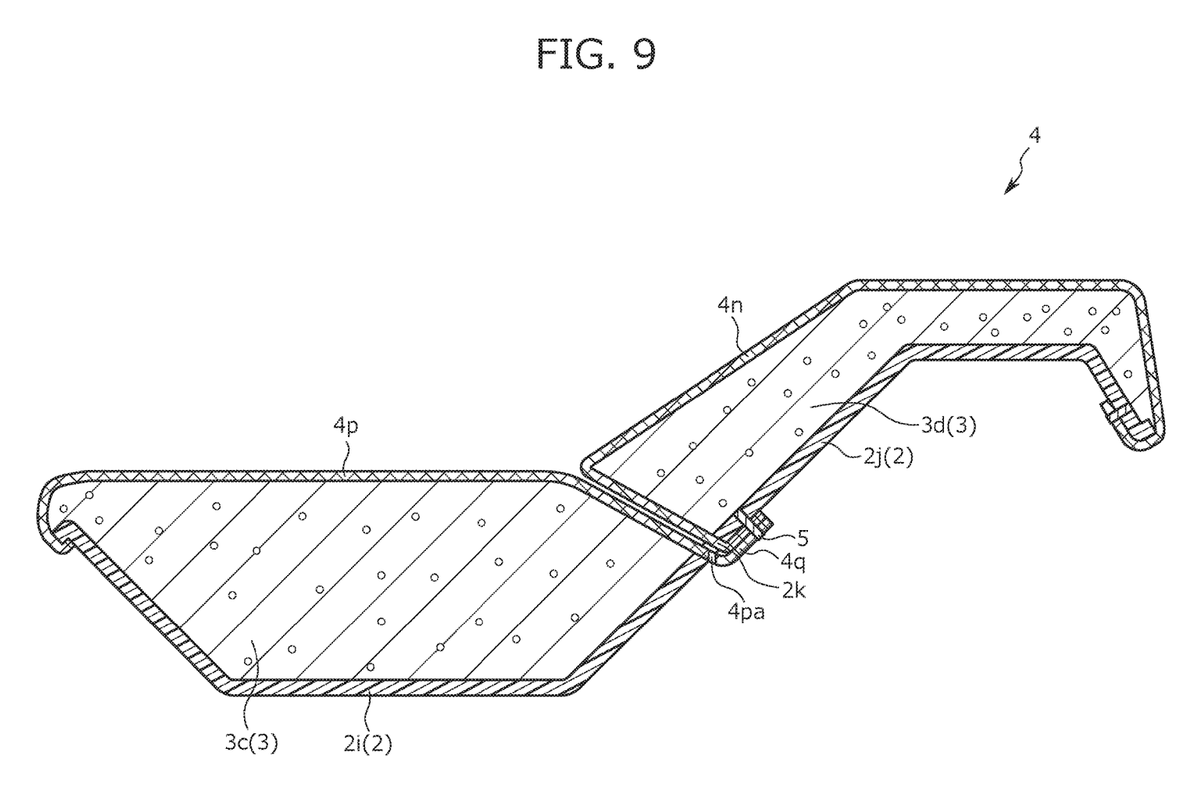
FIG. 9 is a cross-sectional view corresponding to a cross-section taken along the line IX-IX of FIG. 1 and schematically showing a state where the cover member according to a third embodiment of the present disclosure is fixed to the bottom plate.
Figure 10:
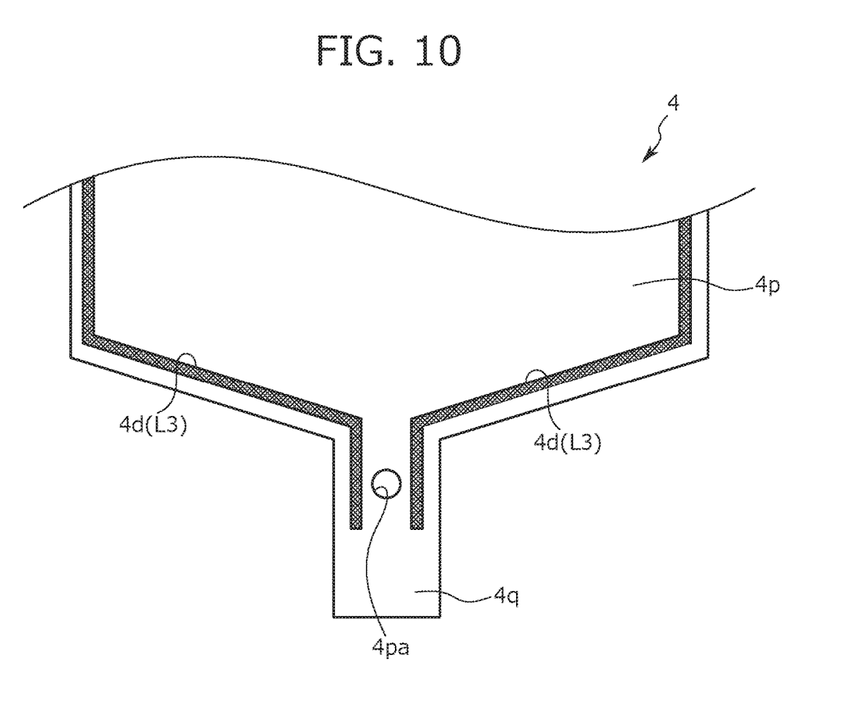
FIG. 10 is a schematic view showing a front cover including a passage hole.

Finally, the configuration of a front cover 4p as the first portion according to the present disclosure and the configuration of the rear cover 4n are described with reference to FIG. 9 and FIG. 10, wherein the front cover 4p and the rear cover 4n configure the cover member 4 according to a third embodiment of the present disclosure. In addition, FIG. 9 is a cross-sectional view corresponding to a cross-section taken along the line IX-IX of FIG. 1 and schematically showing a state where the cover member 4 according to the third embodiment is fixed to the bottom plate 2. FIG. 10 is a schematic view showing the front cover 4p including a passage hole 4pa.

In the foregoing descriptions, according to the first embodiment, the distal end of the discharge guide portion 4g at the center cover 4i and the distal end of the discharge guide portion 4g at the side cover 4j are fixed by the staples 5 to the bottom plate 2 at different positions thereof, and according to the second embodiment, the distal end of the discharge guide portion 4q at the front cover 4m and the distal end of the discharge guide portion 4q at the rear cover 4n are fixed by the staples 5 to the bottom plate 2 at different positions thereof. According to the third embodiment, a distal end of the discharge guide portion 4q at the front cover 4p and a distal end of the discharge guide portion 4q at the rear cover 4n are configured so that the distal ends are fixed by the staple 5 to the bottom plate 2 at the same position.

Specifically, as shown in FIG. 9, the distal end of the discharge guide portion 4q at the front cover 4p and the distal end of the discharge guide portion 4q at the rear cover 4n are fixed by the staple 5 to the backrest portion 2j of the bottom plate 2 in an overlapped manner. As just described, the distal end of the discharge guide portion 4q at the front cover 4p and the distal end of the discharge guide portion 4q at the rear cover 4n are fixed to the bottom plate 2 at the same position in an overlapped manner; therefore, the work to fix the distal ends to the bottom plate 2 is facilitated.

In addition, the passage hole 4pa extending through the front cover 4p in the thickness direction thereof is formed between the pair of discharge lines L3 located in the discharge guide portion 4q at the front cover 4p. In other words, the passage hole 4pa is formed so as to allow a space surrounded by the front cover 4p, the rear cover 4n, and the welded portions 4d to be communicated with the outside. The passage hole 4pa is configured to discharge liquid passing through the space to the outside. The passage hole 4pa is formed so as to be arranged below the discharge hole 2k of the bottom plate 2 in a state where the end of the discharge guide portion 4q of the cover member 4 is attached to the bottom plate 2.

The distal end of the discharge guide portion 4q at the front cover 4p and the distal end of the discharge guide portion 4q at the rear cover 4n extend through and beyond the discharge hole 2k to be fixed to the bottom plate 2 at the same position; therefore the release portion 4r is not formed. Even in such a case, the liquid may be appropriately discharged through the passage hole 4pa downward of the discharge hole 2k.

In addition, if the front cover 4p and the rear cover 4n are fixed by the staple 5 to the bottom portion 2i, it is only necessary to form the passage hole 4pa in the rear cover 4n. In other words, if the front cover 4p and the rear cover 4n extend through the discharge hole 2k downward of the discharge hole 2k to be folded in an overlapped manner, it is only necessary to form the passage hole 4pa in a portion of one of the front cover 4p and the rear cover 4n, which is located below the other of the front cover 4p and the rear cover 4n. Thus, even without the release portion 4r, the liquid can be discharged downward through the passage hole 4pa.

Also, in the foregoing descriptions, two discharge lines, i.e., the discharge lines L1, L2 are provided or the pair of discharge lines L3 or L4 is provided; however, the present disclosure is not limited to such a configuration. For example, as long as the discharge guide portion 4g, 4q is formed at an end of one side in the front to back direction or the right to left direction on the end of the cover member 4, only one discharge line inclined from an end of the other side in the front to back direction or the right to left direction may be formed on the cover member 4.

In addition, in a conveyance vehicle, a portion of which is provided with a movable portion which moves in reaction to an electric signal, water may enter from a slit between a fixed portion and the movable portion. Likewise in such a seat, according to the foregoing configuration where the discharge lines L1, L2, L3, L4 are provided and thereby the liquid is discharged downward of the bottom plate 2, electrical troubles due to entry of the liquid into an electric system can be prevented. Therefore, the foregoing configuration may be particularly applied to such a seat.

TABLE OF REFERENCE NUMERALS

1: Conveyance seat
2: Bottom plate
   2e: Discharge hole
   2f: Vertical wall (top-side protrusion)
   2g: Vertical wall (back-side protrusion)
   2h: Pull-in hole
   2i: Bottom portion
   2j: Backrest portion
   2k: Discharge hole
3: Cushion material
   3a: Center portion
   3b: Side portion
   3c: Front portion
   3d: Rear portion
4: Cover member
   4a: Slit (divided portion)
   4b, 4c, 4d, 4h: Welded portion
   4e: Tarpaulin fabric (reinforcement fabric)
   4f: Loop
   4g: Discharge guide portion
   4i: Center cover (first portion)
   4j: Side cover (second portion)
   4k: Slit (divided portion)
   4m: Front cover (first portion)

4n: Rear cover (second portion)
4p: Front cover (first portion)
  4pa: Passage hole
4q: Discharge guide portion
4r: Release portion
5: Staple
L1, L2, L3, L4: Discharge line

The invention claimed is:

1. A conveyance seat comprising:
a bottom plate; and
a cover member adapted to be attached to the bottom plate,
wherein:
  a discharge hole configured to discharge liquid splashed on the cover member is formed in the bottom plate;
  the cover member includes a divided portion by which the cover member is divided into a first portion and a second portion;
  a welded portion where a portion of the first portion and a portion of the second portion are welded together is formed on the cover member; and
  in a state where the cover member is attached to the bottom plate, the welded portion is inclined downward toward the discharge hole to form at least one discharge line configured to guide discharge of the liquid splashed on the cover member.

2. The conveyance seat according to claim 1, wherein a top-side protrusion surrounding the discharge hole is formed on the top side of the bottom plate.

3. The conveyance seat according to claim 1, wherein a back-side protrusion surrounding the discharge hole is formed on the back side of the bottom plate.

4. The conveyance seat according to claim 1, wherein:
the cover member includes a discharge guide portion that extends through the discharge hole of the bottom plate to guide discharge of the liquid; and
the discharge guide portion is formed protruded compared to its surroundings.

5. The conveyance seat according to claim 1, wherein in a state where the cover member is attached to the bottom plate, the first portion and the second portion extend through and beyond the discharge hole to be fixed to the bottom plate at different positions thereof so that a release portion is formed at an end of the discharge line.

6. The conveyance seat according to claim 1, wherein:
a passage hole that provides a space surrounded by the first portion, the second portion, and the welded portion to be communicated with the outside is formed in the cover member; and
the cover member is attached to the bottom plate such that the at least one discharge line comprises a plurality of discharge lines that extend downward of the discharge hole and such that the passage hole is arranged below the discharge hole.

7. The conveyance seat according to claim 6, wherein:
in a state where the cover member is attached to the bottom plate, the first portion and the second portion extend through and beyond the discharge hole to be fixed to the bottom plate in an overlapped manner; and
the passage hole is formed in one of the first portion and the second portion, which is arranged below the other of the first portion and the second portion.

8. The conveyance seat according to claim 1, wherein:
the bottom plate includes a bottom portion and a backrest portion arranged rearward of the bottom portion;
the bottom portion and the backrest portion are covered by the cover member;
the discharge hole is formed between the bottom portion and the backrest portion; and
the divided portion is arranged between the bottom portion and the backrest portion in a state where the cover member is attached to the bottom plate.

* * * * *